Dec. 26, 1944.    B. S. FLORADAY    2,366,092
VEHICLE WINDOW GUIDE AND REGULATOR ASSEMBLY
Filed Nov. 28, 1941    2 Sheets-Sheet 1
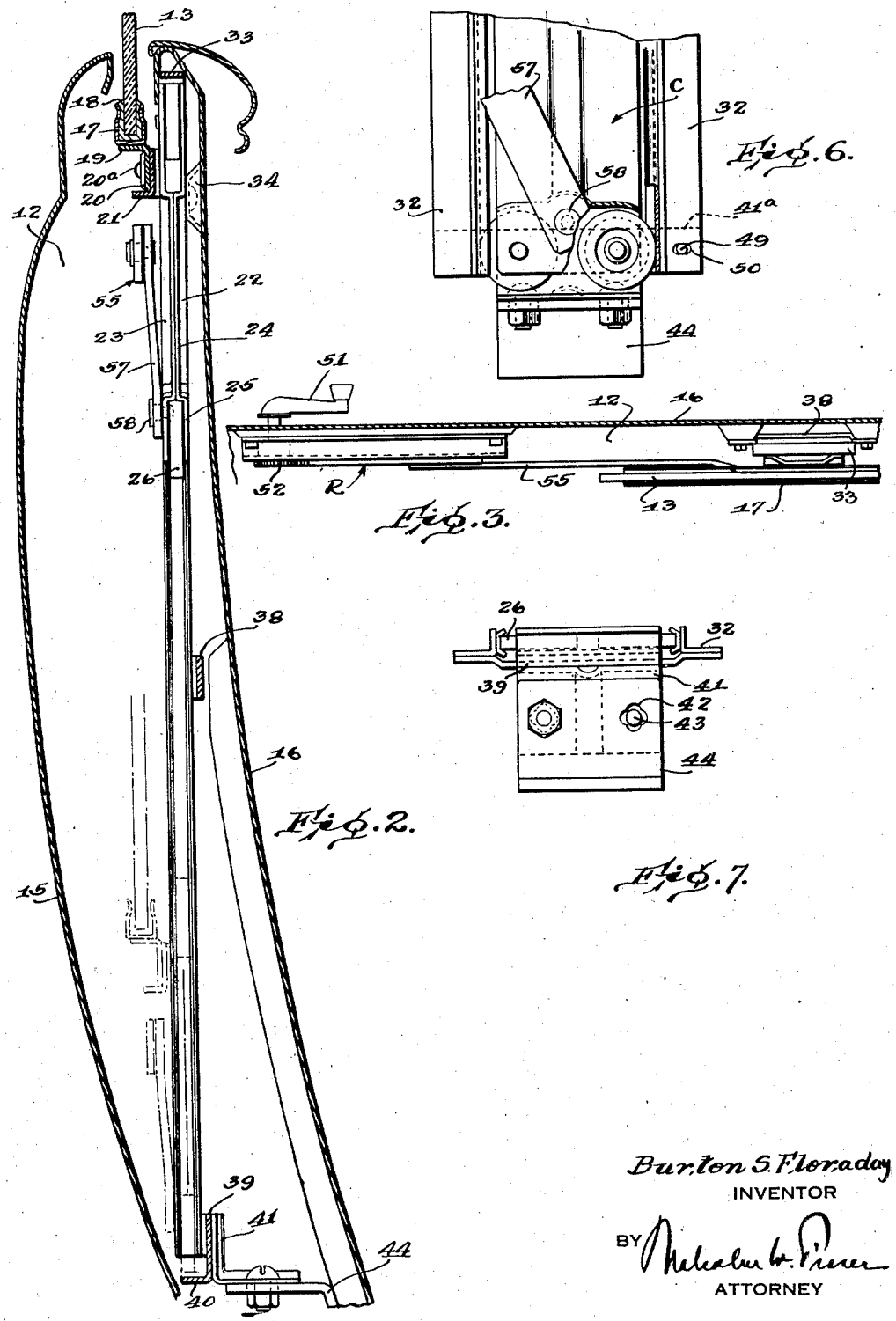
Burton S. Floraday
INVENTOR
BY
ATTORNEY

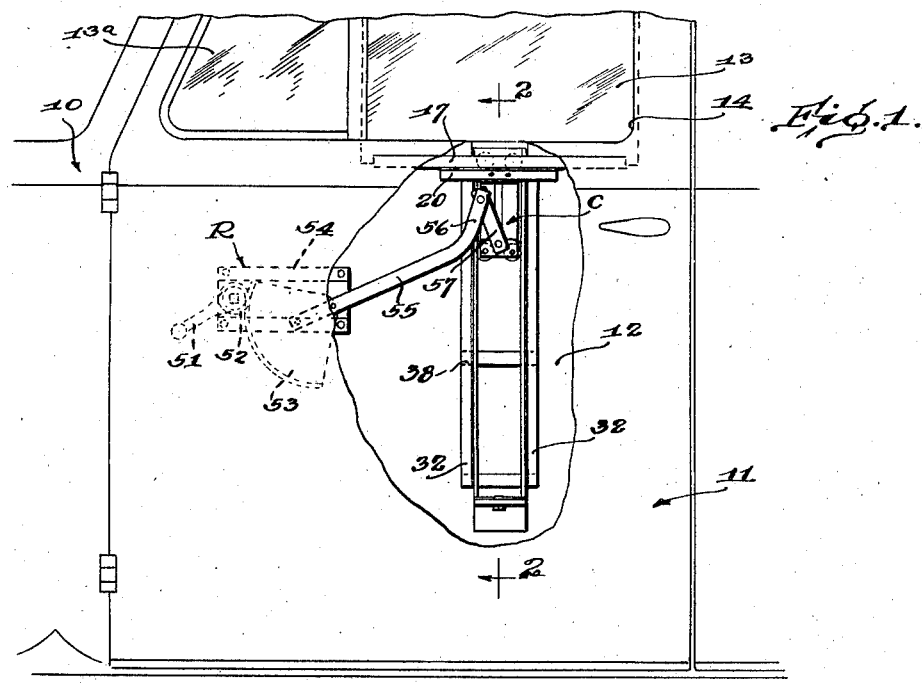

Patented Dec. 26, 1944

2,366,092

UNITED STATES PATENT OFFICE 2,366,092

VEHICLE WINDOW GUIDE AND REGULATOR ASSEMBLY

Burton S. Floraday, Toledo, Ohio, assignor to Detroit Harvester Company, Detroit, Mich., a corporation of Michigan Application November 28, 1941, Serial No. 420,759

1 Claim. (Cl. 296—44.5)

This invention relates to vehicle windows such as automobile windows and is particularly concerned with the guiding and actuation of vehicle windows to and from closed position.

An object is to produce a simple and efficient vehicle window guide assembly for guiding the movement of the window panel to and from closed position which is designed for unitary mounting within the window well, thereby materially simplifying the mounting of the window within the vehicle body and also substantially reducing the assembly costs.

Another object is to produce a vehicle window guide structure having the new and improved features of construction, arrangement and operation by which the same may be efficiently and economically manufactured on a production basis; may be readily and conveniently installed in position of use; may be simply adjusted with respect to the vehicle body and window structures so as readily to align the parts; decreases the length of the guide channels without shortening the window travel; and eliminates the whipping action of the window panel not infrequently caused by slamming of the vehicle door.

A further object is to produce a window regulator and guide structure assembly by which the usual swinging arm of the regulator is so connected to the window panel through parts of the guide structure that a tensioning force is imparted to the window panel during actuation of the window panel toward its raised or closed position thereby militating against breakage or bending of operating parts and effecting a more satisfactory operating mechanism.

Other objects of the invention reside in details of construction, arrangement and operation hereinafter more fully described and for purposes of illustration but not of limitation, embodiments of the invention are shown in the accompanying drawings, in which Figure 1 is a side elevation of an automobile, a part of the outer panel being broken away to disclose the guide assembly and a portion of the window regulator mechanism;

Figure 2 is an enlarged vertical sectional elevation on the line 2—2 of Figure 1;

Figure 3 is an enlarged fragmentary horizontal sectional view showing a portion of the inside door panel, regulator mechanism and guide assembly;

Figure 4 is a fragmentary elevation of the guide tracks, carriage and associated parts;

Figure 5 is a transverse sectional view on the line 5—5 of Figure 4, one of the rollers being shown in section and the other in elevation;

Figure 6 is a fragmentary elevation of the track and carriage assembly, parts being broken away to show the manner in which the rollers engage the guide channels;

Figure 7 is a bottom plan view of the guide and carriage assembly showing particularly the means for adjusting the position of the lower end of the unit relative to the vehicle body;

Figure 8 is an enlarged sectional view of a portion of the assembly showing an alternate form in which the track is provided with a resilient rubber lining with which an all metal roller engages; and Figure 9 is an enlarged sectional view showing an alternate form in which the guide track units are adapted to be adjusted toward and away from each other, thereby to move the tracks closer to or farther away from the rollers instead of permanently connecting the track units together as indicated in the other figures of the drawings.

The illustrated embodiment of the invention comprises an automobile body 10 having a door 11 provided with the usual well 12 into which a glass window panel 13 may be lowered as will be readily understood. The window panel 13 is adapted to wholly or partially cover or uncover the usual window opening 14, the window panel moving in and out of the well 12 to uncover and cover the window opening. As indicated on Figure 2, the well 12 is formed between the outer door panel 15 and the inner door panel 16. In this instance, a wing type panel 13a of the usual type is mounted in advance of the window opening 14.

Embracing the lower edge of the window glass 13 is a metal channel 17 which is U-shaped in cross section and has suitable backing 18 interposed between it and the glass panel 13. Fixed to the underside of the channel 17 and disposed centrally between the opposite edges thereof is a retainer plate 19 having a depending flange 20. The flange 20 is suitably connected as by screws 20a, to a bracket 21 which forms a part of the carriage indicated generally at C. It will be observed that the retainer plate 19 is connected to the carriage C a slight distance below the upper end of the carriage.

The carriage C comprises a pair of substantially rectangular plates 22 and 23, portions of which are embossed inwardly as indicated at 24, abut against and are welded to each other. The upper and lower end portions of the plates 22 and 23 are each embossed outwardly as indicated at 25 to form offset portions for receiving therebetween rollers 26 which are arranged in pairs, two rollers being disposed at each end of the carriage. The rollers of each pair are spaced laterally from each other and a roller on one side is in alignment with the corresponding roller at the opposite end of the carriage C. As indicated on Figure 5, each of the rollers is formed with trunnions 27 which extend into openings formed in the offset portions 25 of the plates. The openings for the trunnions are slightly elongate laterally to prevent the trunnions from freezing, but should not be so large as to enable the rollers to engage the adjacent portions of the carriage. The rollers are in the form of metal discs and embracing the rims thereof are tires or coverings 28 of relatively resilient compressible material, such as rubber or the like.

The carriage C is mounted within a frame having a pair of laterally spaced longitudinally elongate guide tracks 29 and 30, the rollers 26 on one side of the carriage engaging the guide track 29 and on the opposite side engaging the guide track 30. It will be observed that the opposite sides 31 of each of the guide tracks incline or flare outwardly so as to provide a guide channel substantially V-shaped in cross section. The rubber coverings or tires 28 for each of the rollers 26 act as silencers for reducing or eliminating the noise occasioned by the movement of the carriage along the guide tracks. These compressible, resilient rubber surfaces also compensate for minor irregularities in the contour of the guide tracks and also afford, to a limited extent, lateral carriage movement. The guide tracks 29 and 30 are secured as by welding, respectively, to angle strips 32, the apices of the V-shaped guide tracks being welded to the angle strips 32 respectively.

In assembling the structure, the carriage C is interposed between the guide tracks 29 and 30 with the rollers 26 engaging respectively the V-shaped tracks and then a U-shaped spacer or tie member 33 is mounted on the upper ends of the tracks overlapping the outwardly projecting flanges of the angle strips 31 to which they are welded. It will be observed that the outward flanges of the strips 31 project upwardly a slight distance beyond the upper ends of the lateral flanges of the strips 32. Not only does the spacer 33 tie the upper ends of the guide tracks together, but it also serves as a stop to limit the upward movement of the carriage C and prevents the carriage from rolling out of the guide tracks.

The upper end of the guide track assembly is secured to an outwardly embossed portion 34 (Figure 2) of the inner door panel 16. As shown in Figure 4, a screw 35 secures the left-hand angle strip 32 to the embossed portion 34 and a screw 36 secures the right-hand strip 32 to the embossed portion 34. In the right-hand strip 32 is an arcuate slot 37 receiving the screw 36 so as to enable angular adjustment of the assembly about the screw 35 as a pivot.

Intermediate the ends of the angle strips 32 is a brace 38 which is rigidly secured as by welding to each of the strips and assists in reenforcing the structure. The lower ends of the strips 32 are rigidly secured together by a cross piece 39 which has an outwardly extending flange 40, the latter providing a stop to limit the downward movement of the carriage C and cooperating with the spacer 33 at the upper end to retain the carriage C in engagement with the guide tracks.

The cross piece 39 is welded to an L-shaped bracket 41, the lateral flange of which has a pair of cross shaped slots 42 through which bolts 43 may pass for securing the bracket 41 to a stationary bracket 44 which is rigid with the inner door panel 16. It will be manifest that the cross shaped slots 42 enable the guide track assembly to be adjusted toward and away from the outer panel 15 or in a plane substantially parallel to the panel 15 within the limitations afforded by the slots.

From the above description, it will be manifest that the carriage and guide track are held together as a unitary assembly so that these parts may be mounted as a unit within the vehicle body. It will also be apparent that the window glass can be connected to the carriage in a convenient manner by means of the screws 20a connecting the glass retainer 20 to the bracket 21. Not only does this materially simplify assembly problems but it will also be manifest that the window panel 13 is properly supported and guided for vertical reciprocatory movements. The guide channels are spaced inwardly away from the side edges of the window glass in the region of the central portion of the window glass. As above pointed out, adjustments are provided to enable the guide assembly to be properly aligned with relation to the usual vertical guide channels on opposite sides of the window opening 14. It will also be apparent that this structure eliminates the necessity of the usual guide channels disposed within the window well. Heretofore these have been occasioned in having the parts properly align in order to afford free and unrestrained vertical movement of the window glass to and from open position. The objectionable features incident to such ordinary method have been obviated by this guide assembly as will be readily understood by those skilled in this art.

As indicated in Figure 8, instead of employing rollers 26 having compressible rubber tires or rims 28, metal rollers 26a may be employed and compressible rubber strips 45 are adhesively secured to the V-shaped guide channels. The rubber strips 45 extend throughout the length of each of the guide strips and upon engagement by the metal rollers 26a, are sufficiently compressible and resilient to accomplish the results above set forth.

Instead of having the guide strips rigidly secured together, they may be detachably connected in such manner as to afford limited adjustment. For this purpose, as shown on Figure 8, the outwardly extending flange of each of the angle strips 32a is formed with a laterally elongate slot 46 to receive a screw 47 engaging the intermediate brace 38a. In this connection, instead of employing the one-piece spacer 33, a two-piece spacer 33a is employed at the upper end of the guide track assembly and a screw 48 secures these parts together, the screw passing through longitudinally elongate openings in the two parts to obtain the desired adjustment. In this manner the guide tracks can be moved toward or away from each other to obtain the desired compression of the rubber rims 28 or rubber guide strips 45 as the occasion may be. As indicated in Figure 6, similar adjustment is provided at the lower end of the guide track assembly, the cross piece 41a having a screw 49 passing through a laterally elongate opening 50 in one of the angle strips.

An important feature of the invention resides in the manner in which the window panel 13 is actuated to and from closed position. As shown, a window regulator mechanism R of the swinging arm type is suitably secured to the inner panel 16 and has a manually operated crank handle 51 accessible from the inside of the vehicle body. The particular structure of the regulator mechanism forms no part of the present invention so that detail description thereof is not considered necessary. Suffice it to say that the handle 51 operates through the usual clutch assembly to a pinion 52 which meshes with a gear sector 53. The gear sector is pivoted for turning movements on a mounting plate 54. Rigid with the sector 53 is a swinging arm 55 which in this instance has an upturned end portion 56. Pivoted to the free end of the arm portion 56 is a link 57 which inclines downwardly and is connected to the lower or inner end portion of the carriage C by a pin or rivet 58. It will be manifest that upward swinging movement of the arm 55 imparts upward movement to the carriage C and thereby moves the window panel 13 upwardly or toward its closed position. Likewise it will be apparent that upon downward movement of the swinging arm 55, the carriage C and the window panel 13 are moved downwardly to uncover the window opening 14. When the window panel 13 is raised or moved toward its closed position, it will be apparent that the swinging arm 55 imparts a tensioning force to the carriage C through the link 57. This is of particular importance because it militates against breakage or damage to the swinging arm 55 of the regulator which might otherwise be occasioned in the event that the regulator arm were directly connected to the carriage C requiring a pushing force to raise the window panel 13.

It will be understood that numerous changes in details of construction, arrangement and operation may be effected without departing from the spirit of the invention especially as defined in the appended claim.

What I claim is:

A unitary guide assembly for mounting in the well of a vehicle window panel, comprising a pair of laterally spaced vertically disposed guide tracks substantially V-shaped in cross section, mounting strips for said tracks substantially L-shaped in cross section and to which the outer face of said tracks are respectively secured, brace means securing together said mounting strips, said brace means including a strip connecting the upper ends of said mounting strips and providing a stop and also including a cross piece connecting the lower ends of said mounting strips and provided with an attaching flange, a carriage having translatory movement along said tracks, means for attaching the upper end portion of said carriage to a retainer plate on the lower edge portion of the window panel, said carriage comprising a pair of plates having inwardly embossed portions between their ends in abutting relation and secured to each other, complimentary outwardly offset portions, and a pair of rollers journaled in each of the outwardly offset portions at the ends of the plates and engaging said guide tracks.

BURTON S. FLORADAY.